US006903140B2

(12) United States Patent
Font Freide et al.

(10) Patent No.: US 6,903,140 B2
(45) Date of Patent: Jun. 7, 2005

(54) FISCHER-TROPSCH PROCESS

(75) Inventors: Josephus Johannes Helena Maria Font Freide, Guildford (GB); Stephen Anthony Leng, Welwyn Garden (GB); David Charles Griffiths, Esher (GB)

(73) Assignees: BP Exploration Operating C Company Limited, London (GB); Davy Process Technology Limited, London (GB)

( * ) Notice: Subject to any disclaimer, the term of this patent is extended or adjusted under 35 U.S.C. 154(b) by 0 days.

(21) Appl. No.: 10/476,224

(22) PCT Filed: May 17, 2002

(86) PCT No.: PCT/GB02/02314

§ 371 (c)(1),
(2), (4) Date: Oct. 29, 2003

(87) PCT Pub. No.: WO02/097009

PCT Pub. Date: Dec. 5, 2002

(65) Prior Publication Data

US 2004/0157941 A1 Aug. 12, 2004

(30) Foreign Application Priority Data

May 25, 2001 (GB) .............................................. 0112797

(51) Int. Cl.$^7$ ................................................ C07C 27/00
(52) U.S. Cl. ....................... 518/707; 518/700; 518/712; 518/713; 518/715
(58) Field of Search ................................ 518/700, 707, 518/712, 713, 715

(56) References Cited

U.S. PATENT DOCUMENTS 5,344,849 A    9/1994   Ayasse

FOREIGN PATENT DOCUMENTS

WO    WO 01/38269    5/2001

*Primary Examiner*—J. Parsa
(74) *Attorney, Agent, or Firm*—Nixon & Vanderhye

(57) ABSTRACT

Process for the conversion of synthesis gas to a product comprising liquid hydrocarbons and oxygenates. The process includes contacting synthesis gas at an elevated temperature and pressure with a mixed particulate catalyst comprising a mixture of a particulate Fischer-Tropsch catalyst and a particulate oxygenate synthesis catalyst.

12 Claims, No Drawings

FISCHER-TROPSCH PROCESS

This application is the U.S. National Phase of International Application PCT/GB02/02314, filed May 17, 2002, which designated the U.S.

The present invention relates to a process for the conversion of carbon monoxide and hydrogen (synthesis gas) to liquid hydrocarbon products and methanol in the presence of a particulate catalyst.

BACKGROUND OF THE INVENTION

In the Fischer-Tropsch reaction synthesis gas is reacted in the presence of a heterogeneous catalyst to give a hydrocarbon mixture having a relatively broad molecular weight distribution. This product comprises predominantly straight chain saturated hydrocarbons which typically have a chain length of more than 5 carbon atoms. Similarly synthesis gas may be reacted in the presence of a heterogeneous catalyst to give oxygenates e.g. methanol or dimethyl ether.

SUMMARY OF THE INVENTION

It has now been found that the oxygenate synthesis reaction and the Fischer-Tropsch synthesis reaction can be combined and the combined process provides a significant increase in synthesis gas conversion compared with a conventional Fischer-Tropsch process. The combined process also consumes at least a part of the carbon dioxide which may be present in the synthesis gas or which may be a by-product of the Fischer-Tropsch process.

Accordingly the present invention provides a process for the conversion of synthesis gas to a product comprising liquid hydrocarbons and oxygenates wherein said process comprises contacting synthesis gas at an elevated temperature and pressure with a mixed particulate catalyst comprising a mixture of a particulate Fischer-Tropsch catalyst and a particulate oxygenate synthesis catalyst.

Preferably the oxygenate synthesis catalyst is a methanol synthesis catalyst.

The mixed particulate catalyst may be located in a fixed or fluidized bed but preferably the process employs a slurry reactor e.g. a slurry bubble column in which the mixed particulate catalyst is primarily distributed and suspended in the slurry by the energy imparted from the synthesis gas rising from the gas distribution means at the bottom of the slurry bubble column as described in, for example, U.S. Pat. No. 5,252,613.

The mixed particulate catalyst may also be used in a reactor comprising at least one high shear mixing zone and a reactor vessel such as the reactor system described in WO 0138269 (PCT patent application number GB 0004444) which is herein incorporated by reference.

Accordingly, in a preferred embodiment of the invention the process comprises contacting synthesis gas at elevated temperature and pressure with the mixed particulate catalyst comprising a particulate Fischer-Tropsch catalyst and a particulate oxygenate synthesis catalyst suspended in a liquid medium in a reactor system comprising at least one high shear mixing zone and a reactor vessel wherein the process comprises:

a) passing the suspension through the high shear mixing zone(s) where the synthesis gas is mixed with the suspension;

b) discharging a mixture comprising the synthesis gas and the suspension from the high shear mixing zone(s) into the reactor vessel; and c) converting the synthesis gas to liquid hydrocarbons and oxygenates in the reactor vessel to form a product suspension comprising the mixed particulate catalyst suspended in the liquid medium, liquid hydrocarbons and oxygenates.

In order to simplify the process of the preferred embodiment it is preferred that the liquid medium is selected from a liquid hydrocarbon and an oxygenate.

Preferably the product suspension is, at least in part, recycled to the high shear mixing zone(s), as described in WO 0138269 (PCT patent application number GB 0004444). Preferably, a gaseous recycle stream comprising unconverted synthesis gas is withdrawn, either directly or indirectly, from the reactor vessel and is, at least in part, recycled to the high shear mixing zone(s), also as described in WO 0138269 (PCT patent application number GB 0004444).

The reactor vessel may be a tank reactor or a tubular loop reactor.

The high shear mixing zone(s) may be part of the reactor system inside or outside the reactor vessel, for example, the high shear mixing zone(s) may project through the walls of the reactor vessel such that the high shear mixing zone(s) discharges its contents into the reactor vessel. Preferably, the reactor system comprises up to 250 high shear mixing zones, more preferably less than 100, most preferably less than 50, for example 10 to 50 high shear mixing zones. Preferably, the high shear mixing zones discharge into or are located within a single reactor vessel as described in WO 0138269 (PCT patent application number GB 0004444). It is also envisaged that 2 or 3 such reactor systems may be employed in series.

Suitably, the volume of suspension present in the high shear mixing zone(s) is substantially less than the volume of suspension present in the reactor vessel, for example, less than 20%, preferably less than 10% of the volume of suspension present in the reactor vessel.

The high shear mixing zone(s) may comprise any device suitable for intensive mixing or dispersing of a gaseous stream in a suspension of solids in a liquid medium, for example, a rotor-stator device, an injector-mixing nozzle or a high shear pumping means, but is preferably an injector mixing nozzle(s). Suitably, the device is capable of breaking down the gaseous stream into gas bubbles and/or irregularly shaped gas voids.

The kinetic energy dissipation rate in the high shear mixing zone(s) is suitably, at least 0.5 kW/m$^3$ relative to the total volume of suspension present in the system, preferably in the range 0.5 to 25 kW/m$^3$, more preferably 0.5 to 10 kW/m$^3$, most preferably 0.5 to 5 kW/m$^3$, and in particular, 0.5 to 2.5 kW/m$^3$ relative to the total volume of suspension present in the system.

Where the high shear mixing zone(s) comprise an injector mixing nozzle(s) the injector-mixing nozzle(s) can advantageously be executed as a venturi tube (c.f. "Chemical Engineers' Handbook" by J. H. Perry, 3$^{rd}$ edition (1953), p.1285, FIG. 61), preferably an injector mixer (c.f. "Chemical Engineers' Handbook" by J H Perry, 3$^{rd}$ edition (1953), p 1203, FIG. 2 and "Chemical Engineers' Handbook" by R H Perry and C H Chilton 5$^{th}$ edition (1973) p 6–15, FIGS. 6–31) or most preferably as a liquid-jet ejector (c.f. "Unit Operations" by G G Brown et al, 4$^{th}$ edition (1953), p.194, FIG. 210). The injector mixing nozzle(s) may also be executed as a venturi plate positioned within an open ended conduit which discharges the mixture of synthesis gas and suspension into a tank reactor. Alternatively the venturi plate may be positioned within a tubular loop reactor. Suitably, synthesis gas is introduced into the open-ended conduit or tubular loop reactor downstream of the venturi plate. The injector-mixing nozzle(s) may also be executed as "gas blast" or "gas assist" nozzles where gas expansion is used to drive the nozzle (c.f. "Atomisation and Sprays" by Arthur H Lefebvre, Hemisphere Publishing Corporation, 1989). Where the injector-mixing nozzle(s) is executed as a "gas blast" or "gas assist" nozzle, the suspension of catalyst is fed to the nozzle at a sufficiently high pressure to allow the suspension to pass through the nozzle while the gaseous reactant stream is fed to the nozzle at a sufficiently high pressure to achieve high shear mixing within the nozzle.

The high shear mixing zone(s) may also comprise a high shear pumping means, for example, a paddle or propeller having high shear blades positioned within an open ended pipe which discharges the mixture of synthesis gas and suspension into the reactor vessel. Preferably, the high shear pumping means is located at or near the open end-of the pipe, for example, within 1 metre preferably within 0.5 metres of the open end of the pipe. Alternatively, the high shear pumping means may be positioned within a tubular loop reactor vessel. Synthesis gas may be injected into the pipe or tubular loop reactor vessel, for example, via a sparger, located immediately upstream or downstream, preferably upstream of the high shear pumping means, for example, preferably, within 1 metre, preferably within 0.5 metre of the high shear pumping means. Without wishing to be bound by any theory, the injected synthesis gas is broken down into gas bubbles and/or irregularly shaped gas voids by the fluid shear imparted to the suspension by the high shear pumping means.

Where the injector mixing nozzle(s) is executed as a venturi nozzle(s) (either a conventional venturi nozzle or as a venturi plate), the pressure drop of the suspension over the venturi nozzle(s) is typically in the range of from 1 to 40 bar, preferably 2 to 15 bar, more preferably 3 to 7 bar, most preferably 3 to 4 bar. Preferably, the ratio of the volume of gas ($Q_g$) to the volume of liquid ($Q_l$) passing through the venturi nozzle(s) is in the range 0.5:1 to 10:1, more preferably 1:1 to 5:1, most preferably 1:1 to 2.5:1, for example, 1:1 to 1.5:1 (where the ratio of the volume of gas ($Q_g$) to the volume of liquid ($Q_l$) is determined at the desired reaction temperature and pressure).

Where the injector mixing nozzle(s) is executed as a gas blast or gas assist nozzle(s), the pressure drop of gas over the nozzle(s) is preferably in the range 3 to 100 bar and the pressure drop of suspension over the nozzle(s) is preferably in the range of from 1 to 40 bar, preferably 4 to 15, most preferably 4 to 7. Preferably, the ratio of the volume of gas ($Q_g$) to the volume of liquid ($Q_l$) passing through the gas blast or gas assist nozzle(s) is in the range 0.5:1 to 50:1, preferably 1:1 to 10:1 (where the ratio of the volume of gas ($Q_g$) to the volume of liquid ($Q_l$) is determined at the desired reaction temperature and pressure).

Suitably, the shearing forces exerted on the suspension in the high shear mixing zone(s) are sufficiently high that the synthesis gas is broken down into gas bubbles having diameters in the range of from 1 $\mu$m to 10 mm, preferably from 30 $\mu$m to 3000 $\mu$m, more preferably from 30 $\mu$m to 300 $\mu$m.

Without wishing to be bound by any theory, it is believed that the irregularly shaped gas voids are transient in that they are coalescing and fragmenting on a time scale of up to 500 ms, for example, over a 10 to 50 ms time scale. The irregularly shaped gas voids have a wide size distribution with smaller gas voids having an average diameter of 1 to 2 mm and larger gas voids having an average diameter of 10 to 15 mm.

The high shear mixing zone(s) can be placed at any position on the walls of the reactor vessel (for example, at the top, bottom or side walls of a tank reactor). Where the reactor vessel is a tank reactor the suspension is preferably withdrawn from the reactor vessel and is at least in part recycled to a high shear mixing zone(s) through an external conduit having a first end in communication with an outlet for suspension in the reactor vessel and a second end in communication with an inlet of the high shear mixing zone. The suspension may be recycled to the high shear mixing zone(s) via a mechanical pumping means, for example, a slurry pump, positioned in the external conduit. Owing to the exothermic nature of the Fischer-Tropsch synthesis reaction, the suspension recycle stream is preferably cooled by means of a heat exchanger positioned on the external conduit (external heat exchanger). Additional cooling may be provided by means of an internal heat exchanger comprising cooling coils, tubes or plates positioned within the suspension in the tank reactor.

Suitably, the ratio of the volume of the external conduit (excluding the volume of any external heat exchanger) to the volume of the tank reactor is in the range of 0.005:1 to 0.2:1.

Where the reactor vessel is a tubular loop reactor, a single high shear mixing zone, in particular an injector-mixing nozzle may discharge the mixture comprising synthesis gas and the suspension into the tubular loop reactor. Alternatively, a series of injector-mixing nozzles may be arranged around the tubular loop reactor. If necessary, suspension may be circulated around the tubular loop reactor via at least one mechanical pumping means e.g. a paddle or propeller. An external heat exchanger may be disposed along at least part of the tubular loop reactor, preferably along substantially the entire length of the tubular loop reactor thereby providing temperature control. It is also envisaged that an internal heat exchanger, for example cooling coils, tubes or plates may be located in at least part of the tubular loop reactor.

Preferably the Fischer-Tropsch reactor system of the preferred embodiment is operated with a gas hourly space velocity (GHSV) in the range of 100 to 40000 $h^{-1}$, more preferably 1000 to 30000 $h^{-1}$, most preferably 2000 to 15000, for example 4000 to 10000 $h^{-1}$ at normal temperature and pressure (NTP) based on the feed volume of synthesis gas at NTP.

Usually the suspension discharged into the reactor vessel from the high shear mixing zone(s) comprises less than 40% wt of mixed catalyst particles, more preferably 10 to 30% wt of mixed catalyst particles, most preferably 10 to 20% wt of mixed catalyst particles.

The process of the invention is preferably carried out at a temperature of 180–280° C., more preferably 190–240° C.

The process of the invention is preferably carried out at a pressure of 5–50 bar, more preferably 15–35 bar, generally 20–30 bar.

The synthesis gas may be prepared using any of the processes known in the art including partial oxidation of hydrocarbons, steam reforming, gas heated reforming, microchannel reforming (as described in, for example, U.S. Pat. No. 6,284,217 which is herein incorporated by reference), plasma reforming, autothermal reforming and any combination thereof. A discussion of these synthesis gas production technologies is provided in "Hydrocarbon Processing" V78, N. 4, 87–90, 92–93 (April 1999) and "Petrole et Techniques", N. 415, 86–93 (July–August 1998). It is also envisaged that the synthesis gas may be obtained by catalytic partial oxidation of hydrocarbons in a microstructured reactor as exemplified in "IMRET 3: Proceedings of the Third International Conference on Microreaction Technology", Editor W Ehrfeld, Springer Verlag, 1999, pages 187–196. Alternatively, the synthesis gas may be obtained by short contact time catalytic partial oxidation of hydrocarbonaceous feedstocks as described in EP 0303438. Preferably, the synthesis gas is obtained via a "Compact Reformer" process as described in "Hydrocarbon Engineering", 2000, 5, (5), 67–69; "Hydrocarbon Processing", 79/9, 34 (September 2000); "Today's Refinery", 15/8, 9 (August 2000); WO 99/02254; and WO 200023689.

Preferably, the ratio of hydrogen to carbon monoxide in the synthesis gas is in the range of 20:1 to 0.1:1 by volume and especially in the range of 5:1 to 1:1 by volume e.g. 2:1 by volume.

The synthesis gas may contain high amounts of carbon dioxide for example, up to 50% by volume of carbon dioxide and usually between 5 to 40% by volume of carbon dioxide. Most preferably the synthesis gas contains 25 to 35% by volume of carbon dioxide e.g. 30% by volume. The carbon dioxide may arise from the hydrocarbonaceous feedstock to the synthesis gas production stage, for example, where natural gas is used as a feedstock this may contain up to 15% by volume of carbon dioxide. The carbon dioxide may also be supplied to the synthesis gas production stage from a carbon dioxide separator which is used to remove carbon dioxide from a natural gas stream prior to liquefaction. Carbon dioxide may also be generated by virtue of the water-gas shift reaction. Suitably, the ratio of carbon monoxide to carbon dioxide in the synthesis gas. may be between 100: 1 to 1:100, preferably between 20:1 to 1:1, more preferably between 10:1 to 5:1 by volume.

An advantage of the process of the present invention is that the oxygenates generated in the process may react with the carbon dioxide present in the synthesis gas as well as the carbon monoxide and hydrogen to form liquid hydrocarbon products.

Furthermore carbon dioxide also reacts with the hydrogen upon contact with the oxygenate synthesis catalyst(s) to form hydrocarbons and/or oxygenates.

However it is also envisaged that the oxygenates may be separated from the liquid hydrocarbons. The proportion of oxygenates in the product of the combined process and the proportion further converted to liquid hydrocarbon products can be manipulated by varying the amounts of Fischer-Tropsch catalyst and oxygenate synthesis catalyst in the mixed particulate catalyst.

Preferably the oxygenates comprise dimethyl ether and/or methanol, especially methanol.

Preferably, the liquid hydrocarbons produced by the Fischer-Tropsch synthesis reaction comprise a mixture of hydrocarbons having a chain length of greater than 5 carbon atoms. Suitably, the liquid hydrocarbons comprise a mixture of hydrocarbons having chain lengths of from 5 to about 90 carbon atoms. Preferably, a major amount, for example, greater than 60% by weight, of the hydrocarbons have chain lengths of from 5 to 30 carbon atoms.

Conventionally a gaseous purge stream is taken from the Fischer-Tropsch system to prevent accumulation of gaseous by-products, for example, methane, in the system. An advantage of the process of the present invention is that carbon dioxide is consumed in the process so that the amount of purge gas which is required to be taken from the system is reduced. Also where the purge gas is recycled to the synthesis gas production stage, the amount of carbon dioxide which is recycled together with methane and other gaseous hydrocarbons is reduced compared with a conventional Fischer-Tropsch process.

The mixed particulate catalyst employed in the process of the present invention comprises a combination of any particulate catalyst known to be active in Fischer-Tropsch synthesis and any catalyst known to be active in oxygenate synthesis especially methanol synthesis. The ratio of Fischer-Tropsch catalyst to oxygenate synthesis catalyst is usually in the range of 20:1 to 1:10 preferably 15:1 to 1:1 and especially 10:1 to 5:1 by weight.

Fischer-Tropsch catalysts usually comprise supported or unsupported Group VIII metals. Of these iron, cobalt and ruthenium are preferred, particularly iron and cobalt, most particularly cobalt.

A preferred catalyst is supported on an inorganic oxide, preferably a refractory inorganic oxide. Preferred supports include silica, alumina, silica-alumina, the Group IVB oxides, titania (primarily in the rutile form) and most preferably zinc oxide. The supports generally have a surface area of less than about 100 $m^2/g$, suitably less than 50 $m^2/g$, for example, less than 25 $m^2/g$ or about 5 $m^2/g$.

The catalytic metal is present in catalytically active amounts usually about 1–100 wt %, the upper limit being attained in the case of metal based catalysts, preferably 2–40 wt %. Promoters may be added to the catalyst and are well known in the Fischer-Trospch catalyst art. Promoters can include ruthenium, platinum or palladium (when not the primary catalyst metal), aluminium, rhenium, hafnium, cerium, lanthanum and zirconium, and are usually present in amounts less than the primary catalytic metal (except for ruthenium which may be present in coequal amounts), but the promoter:metal ratio should be at least 1:10. Preferred promoters are rhenium and hafnium.

Catalysts known to be active in oxygenate synthesis in particular methanol synthesis include zinc-chromium oxide catalysts but preferably comprise oxides of zinc and preferably oxides of copper e.g. copper oxide supported on zinc oxide or alumina. Alternatively the catalysts may contain copper chromite.

The methanol synthesis catalyst generally has a surface area of less than about 100 $m^2/g$, suitably less than 50 $m^2/g$, for example, less than 25 $m^2/g$ or about 5 $m^2/g$.

The mixed particulate catalyst may have an average particle size in the range 5 to 500 microns, preferably 5 to 100 microns, for example, in the range 5 to 40 microns. The average particle size of the Fischer-Tropsch catalyst may be the same or different to that of the methanol synthesis catalyst. Generally the average particle sizes of the Fischer-Tropsch and methanol synthesis catalysts are substantially the same when used in a fixed or fluidized bed reactor i.e. unimodal particle size distribution. When slurry reactors are used and especially when tank or tubular loop reactors (as herein described above) are employed the Fischer-Tropsch catalyst is preferably different in average particle size to that of the methanol synthesis catalyst i.e. bimodal particle size distribution.

A product suspension may be withdrawn from the reactor system of the preferred embodiment as described in WO 0138269 (PCT patent application number GB 0004444). Suitably, the oxygenates may be separated from the liquid hydrocarbons, for example, by distillation.

EXAMPLES

The invention will now be described with reference to the following example.

Example 1

5 g of a copper on zinc oxide methanol synthesis catalyst was transferred under an inert gas blanket to a 1 litre stirred tank reactor containing approximately 300 ml of squalane.

A synthesis gas mixture containing hydrogen, carbon monoxide, and carbon dioxide (with a hydrogen:carbon monoxide ratio of 2:1 by volume) was passed to the reactor at a gas hourly space velocity (GHSV) of 8000 hr$^{-1}$ whilst the reactor pressure was increased to 420 psig.

The temperature was then raised to 240° C. After 50 hours on-stream (HOS) the product was analysed and the results are shown in table 1.

The temperature was then reduced to 50° C. and the gas stream was switched to hydrogen flowing at a GHSV of 2000 hr$^{-1}$. The reactor was then cooled to room temperature and the pressure reduced to atmospheric pressure.

5 g of a cobalt on zinc oxide Fischer-Tropsch catalyst was then added to the reactor contents under an inert gas blanket. The hydrogen flow to the reactor was switched to the synthesis gas mixture which was passed to the reactor a GHSV of 8000 hr$^{-1}$ whilst the reactor pressure was increased to 431 psig. The temperature was then raised to 221° C. After 148 HOS the product was analysed and the results are shown in table 1.

TABLE 1

| HOS | GHSV (hr$^{-1}$) | Temp (° C.) | Pressure (psig) | Conversion (mole %) CO | CO2 | MeOH | Selectivity (Carbon mole %) Liquid hydrocarbons |
|---|---|---|---|---|---|---|---|
| | | | | copper on zinc oxide | | | |
| 50 | 8000 | 240 | 420 | 31.1 | 58.2 | 91.8 | 0.0 |
| | | | copper on zinc oxide + cobalt on zinc oxide | | | | |
| 148 | 8000 | 221 | 431 | 41.4 | 9.1 | 11.3 | 54.3 |

It can be seen that the mixed particulate catalyst produces both methanol and liquid hydrocarbons.

What is claimed is:

1. A process for the conversion of synthesis gas to a product comprising liquid hydrocarbons and methanol, wherein said process comprises contacting synthesis gas at an elevated temperature and pressure with a suspension of mixed particulate catalyst comprising a mixture of a particulate Fischer-Tropsch catalyst and a particulate methanol synthesis catalyst suspended in a liquid medium in a reactor system comprising at least one high shear mixing zone and a reactor vessel, the process comprising:

a) passing the suspension through a said high shear mixing zone(s) where the synthesis gas is mixed with the suspension;

b) discharging a mixture comprising the synthesis gas and the suspension from the high shear mixing zone(s) into the reactor vessel; and c) converting the synthesis gas to liquid hydrocarbons and methanol in the reactor vessel to form a product suspension comprising the mixed particulate catalyst suspended in the liquid medium, liquid hydrocarbons and methanol;

wherein the product suspension is, at least in part, recycled to the high shear mixing zone(s).

2. A process according to claim 1 wherein the reactor vessel is a tank reactor or a tubular loop reactor.

3. A process according to claim 1 wherein the high shear mixing zone(s) project through the walls of the reactor vessel such that the high shear mixing zone(s) discharges its contents into the reactor vessel or is located within the reactor vessel.

4. A process according to claim 1 wherein the reactor system comprises up to 250 high shear mixing zones.

5. A process according to claim 1 wherein the high shear mixing zone(s) comprise an injector-mixing nozzle(s).

6. A process according to claim 5 wherein the injector mixing nozzle(s) is a venturi nozzle(s) or a gas blast nozzle (s).

7. A process according to claim 1 wherein the Fischer-Tropsch reaction is preferably carried out at a temperature of 180–280° C. and at a pressure of 5–50 bar.

8. A process according to claim 1 wherein the ratio of hydrogen to carbon monoxide in the synthesis gas is in the range of 20:1 to 0.1:1 by volume.

9. A process according to claim 1 wherein the synthesis gas comprises 5 to 40% by volume of carbon dioxide.

10. A process according to claim 1 wherein the ratio of Fischer-Tropsch catalyst to methanol synthesis catalyst is usually in the range of 20:1 to 1:10 by weight.

11. A process according to claim 1 wherein the Fischer-Tropsch catalyst is cobalt supported on zinc oxide.

12. A process according to claim 1 wherein the methanol synthesis catalyst is copper supported on zinc oxide.

* * * * *